(12) United States Patent
Monson et al.

(10) Patent No.: US 6,471,355 B1
(45) Date of Patent: Oct. 29, 2002

(54) IMAGE CONTROL SYSTEM

(75) Inventors: Robert James Monson, St. Paul; Michael Edward Smith, St. Bonifacius, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/507,494

(22) Filed: Feb. 18, 2000

(51) Int. Cl.[7] .................. G03B 21/26; G03B 21/00; G03B 21/60; G03B 21/56; G03B 37/04
(52) U.S. Cl. .................. 353/30; 353/69; 353/70; 353/50; 353/37; 353/78; 353/99; 348/383; 348/745; 359/453; 359/460; 352/69; 352/70; 352/71; 352/47
(58) Field of Search .................. 353/30, 11, 31, 353/50, 69, 34, 70, 37, 121, 122, 94, 77, 78, 98, 99; 348/383, 745, 750, 751, 840; 359/453, 460; 352/47, 69, 70, 71

(56) References Cited

U.S. PATENT DOCUMENTS

| | | | | |
|---|---|---|---|---|
| 5,619,255 A | * | 4/1997 | Booth | 348/36 |
| 5,707,128 A | * | 1/1998 | Dugdale | 353/50 |
| 5,902,030 A | * | 5/1999 | Blanchard | 353/30 |
| 6,219,011 B1 | * | 4/2001 | Aloni et al. | 345/1 |
| 6,222,593 B1 | * | 4/2001 | Higurashi et al. | 348/745 |
| 6,254,239 B1 | * | 7/2001 | Hibner, II et al. | 353/94 |
| 6,310,650 B1 | * | 10/2001 | Johnson et al. | 348/383 |
| 2001/0022651 A1 | * | 9/2001 | Kubota et al. | 353/94 |
| 2002/0015052 A1 | * | 2/2002 | Deering | 345/647 |

* cited by examiner

Primary Examiner—Russell Adams
Assistant Examiner—Melissa J Koval
(74) Attorney, Agent, or Firm—Patrick M. Hogan; Glenn W. Bowen

(57) ABSTRACT

An image alignment system for rear projection in which a portion of the normally changing pixel pattern contains a pixel reference mark, which appears in each of the side-by-side pixel images projected onto a screen. A camera having a field of view large enough to encompass the pixel reference mark of each of the images on the screen captures the location of the pixel reference marks to enable a computer to determine the coordinates of the each of the pixel reference marks and generate a deviation signal represented of the visual misalignment of the side-by-side images. A drive member controllable by the deviation signal from the computer repositions one of the side-by-side images with respect to the other to thereby align the images to produce a single visually seamless image. The camera and computer can continually monitor both of the pixel reference marks to continually generate a deviation signal so that the side-by-side images can automatically be brought into a single visually seamless image.

21 Claims, 2 Drawing Sheets

IMAGE CONTROL SYSTEM

FIELD OF THE INVENTION

This invention relates generally to an image alignment system and a method for producing and maintaining a visually seamless image between two or more side-by-side images that are projected onto a single screen.

BACKGROUND OF THE INVENTION

The concept of projecting multiple side-by-side images onto a screen to produce a single visual image is well known in the art. One of the difficulties with projecting multiple side-by-side images onto a screen is to align the multiple side-by-side images so that they appear to the viewer as a single visually seamless image. In rear projection systems, which are often used on mobile equipment or in environments where shock or vibration are common, the multiple side-by-side images can get out of alignment as a result of external forces thus resulting in multiple side-by-side images which do not appear as a single visually seamless image. In use of the present invention with digital imagers, an image formed of pixels is projected onto the screen with a portion of the projected pixels in the image remaining differentially distinguishable from the rest of the image as the image changes. The present invention provides a method and apparatus that uses conventional components to capture the location of a reference pattern of pixels within or adjacent the projected image and then uses the coordinates of the reference pattern of pixels in the side-by-side images to produce a single visually seamless image and to maintain the multiple side-by-side images as a single visually seamless image.

DESCRIPTION OF THE PRIOR ART

U.S Pat. No. 5,619,255 discloses the use of multiple cameras to display a series of three images in a side-by-side arrangement.

U.S. Pat. 5,902,030 discloses a system where a fresnel lens is used to align the images.

SUMMARY OF THE INVENTION

Briefly, the present invention includes dedication of a portion of the normally changing pixels in a projected image, which is formed of multiple pixels, to a pixel reference mark. Normally, two or more images are simultaneously projected in a side-by-side relationship on the screen. The pixel reference mark appears in each of the side-by-side images projected onto the screen. A camera, which has a field of view large enough to encompass the pixel reference mark in each of the side-by-side images on the screen, enables a computer to determine the coordinates of the each of the pixel reference marks and generate a deviation signal represented of the visual misalignment of the side-by-side images. A drive member controllable by the deviation signal from the computer repositions one of the digital side-by-side images with respect to the other to thereby produce a visually seamless image. The camera can continually monitor the pixel reference marks to continually generate a deviation signal so that the side-by-side images can automatically be brought into alignment to produce a single visually seamless image.

DESCRIPTION OF THE PREFERRED EMBODIMENT

Figure 1:
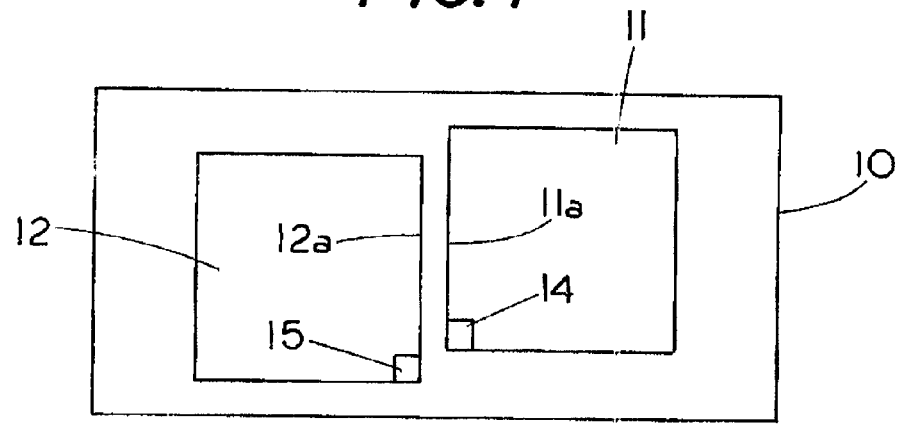
FIG. 1 is a schematic reposition of two side-by-side images that are out of alignment with each other and do not appear as a single visually seamless image.

FIG. 1 shows a rear view of a rear projection screw 10 having a first pixel image 11 projected onto a portion of rear projection screen 10 and a second pixel image 12 projected in a side-by-side relationship onto a further portion of the rear projections screen 10. In the embodiment shown if the images 11 and 12 are to produce a single visually seamless image the edge 12a of visual image 12 and the edge 11a of visual image 11 should be in alignment with one another in both the x and y axis. Located at the corners of the each of two side-by-side images 11 and 12 are two reference marks, a first reference mark 14 located within image 11 and a second reference mark 15 located within image 15.

Figure 2:
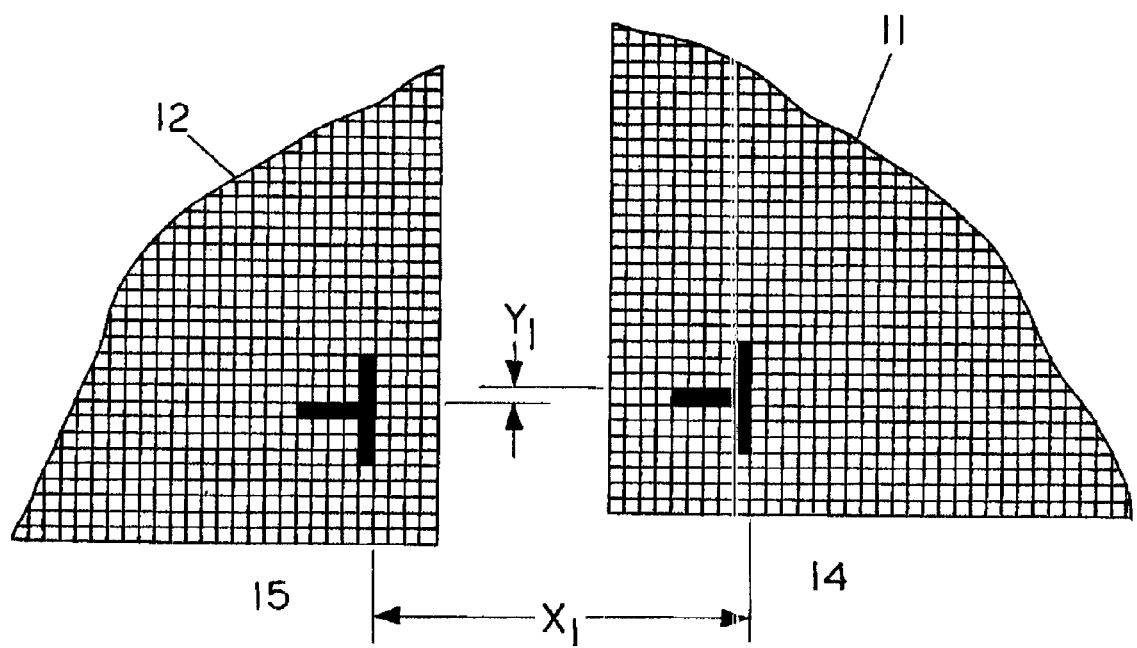
FIG. 2 is an enlarged view of a corner of each of the side-by-side images shown in FIG. 1 to reveal a first pixel reference mark on one image and a second pixel reference mark on the other image.

FIG. 2 shows an enlarged view of a corner of image 11 and a corner of image 12 to reveal the reference marks 14 and 15 which are referred to herein as pixel pattern reference marks. Located in the corner of image 11 is first pixel reference mark 14 that is distinguishably distinct from image 11. That is, with the use of digital imagers one can form a pixel image 11 on screen 10 and within the pixel image 11 a select number of pixels are dedicated to form a first pixel pattern reference mark 14 which remains in the same relative position in image 14. As the first pixel pattern reference mark 14 remains in the same position with respect to image 11 the first pixel pattern reference mark 14 can be used as an indicator of the spatial location of image 11. In order to prevent the viewer from being distracted by the pixel pattern reference mark 14, which is distinguishably distinct from the rest of the image 11, the pixel pattern reference mark 14 can be selected to be as unobivious as possible yet remain distinguishably distinct with respect to the changing image 11 that is projected onto the screen. One way to minimize the visual intrusiveness of pixel pattern reference mark 14 is to project the pixel pattern reference mark 14 into a corner region of image 11.

Located in a corner of image 12 is second pixel pattern reference mark 15 that is distinguishably distinct from image 12 in the same manner that pixel pattern image 14 is distinguishably distinct from image 14. Likewise, in order to prevent the viewer from being distracted by the second pixel pattern reference mark 15 the second pixel pattern reference 15 can be selected to be as unobivious as possible yet remain distinguishably distinct with respect to image 12 that is projected onto the screen 10.

It should be pointed out that the dedication of selected pixels in an image as reference marks can, for example, involve dedication of selected pixels to a constant color or to a color that is always in contrast with the pixels surrounding the pixel pixels in the image. For example, if the pixel in the image surrounding the pixel pattern reference marks are white the pixel pattern reference mark can be programmed to take on a dark color so as to contrast therewith and thus remain distinguishably distinct from the changing image on the screen. Likewise if the pixels surrounding the pixel pattern reference mark become black the pixel pattern reference mark can be programmed to take on a light color to remain distinguishably distinct from the changing image on the screen.

The number of pixels that are dedicated to the pixel pattern reference mark can vary as well as the pattern arrangement of the pixels in the pixel pattern reference mark. In some instances, one, two three or four pixels may be sufficient in others more pixels may be used to make a more distinct pixel pattern. In addition, the pixels shown arranged in a T pattern can be arranged in other patterns that provides a distinct pattern. The number of pixels used in the pixel pattern reference mark can best be determined by the conditions under which the images will be viewed. Although, one pixel could be used it is preferred to use an arrangement of multiple pixels to provide a larger pixel pattern reference mark.

FIG. 2 illustrates the pixel reference mark 14 and the pixel reference mark 15 in a misalignment condition with the x axis out of alignment, which is indicated by an amount $x_1$, and the y axis out of alignment, which is indicated by an amount $y_1$.

Figure 3:
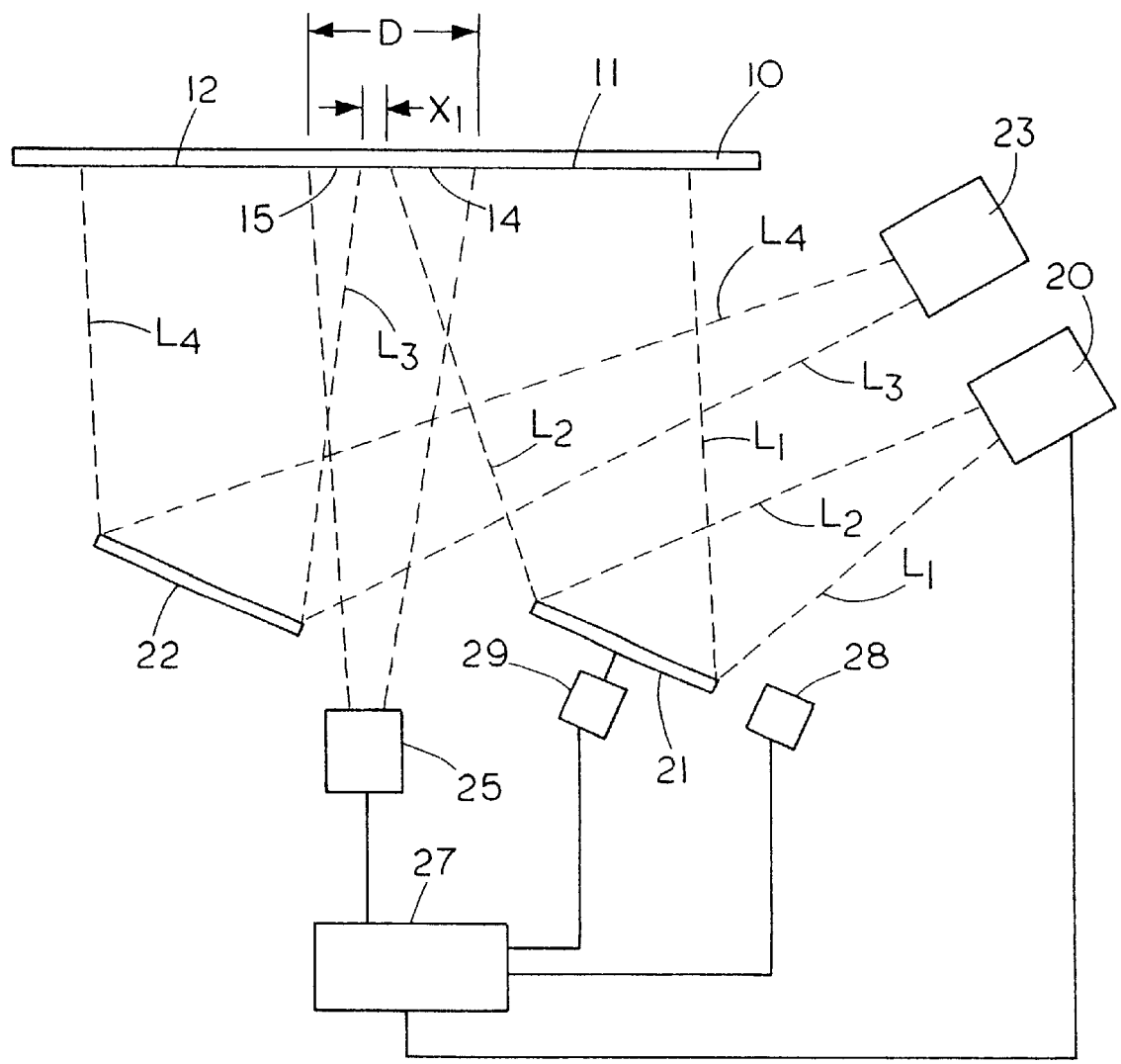
FIG. 3 is a top partial schematic view of two digital imagers each projecting a separate image onto a rear projection screen with the system including a camera for viewing the projected images and a computer for determining a deviation signal.

In order to understand the operation of the system, reference should be made to FIG. 3 which shows rear projection screen 10 with a first digital image 11 projected thereon from a digital imager 20. In operation the digital image, which can be continually changing, remains within boundaries defined by ray $L_1$ and $L_2$ as it reflects off a reflecting device such as mirror 21 to rear projection screen 10. Similarly, a second digital image 12, which also can be continually changing, from digital imager 23 reflects off a reflecting device such as a mirror 22 to rear projection screen 10. The boundaries of the second digital image is defined by rays $L_3$ and $L_4$. As noted in FIG. 2, the amount of deviation of the images in the x-axis is indicated by $x_1$ and the amount of deviation in the y-axis is indicated by $y_1$.

Referring to FIG. 3, located rearward of the projection screen 10 is a camera 25 that has a field of view of diameter D. The field of view D is sufficiently large so that first pixel reference mark 14 and second pixel reference 15 are within the field of view of the camera when the images 11 and 12 are in misalignment with each other. The camera optically captures the position of the two pixel reference mark 14 and 15 with respect to each other so that a processor can determine the coordinate differences between the two pixel reference marks 14 and 15. By determining the x, y coordinate differences between the two pixel reference marks 14 and 15 one can generate a deviation signal. The deviation signal can be sent from computer 27 to first drive member 29 which repositions a mirror 21 in the y direction and a second drive member 28 which repositions mirror 21 in the x-direction. By repositioning mirror 21 the position of image 11 with respect to image 12 can be adjusted to bring the side-by-side images 11 and 12 into alignment with each other so that the operator sees only a single visual seamless image. Once the images are in visual seamless alignment with each other the deviation signal goes to zero and no further repositioning of the images is required. It is apparent that by continually monitoring the pixel reference marks one can quickly generate a deviation signal to bring the two images back into visually seamless alignment with each other. Thus the present invention is especially suited for those conditions that outside factors produce misalignment of side-by-side images projected on to a screen.

While the invention has been shown and described with respect to two side-by-side pixel pattern images it is apparent that one can use the method and apparatus of the present invention for maintaining three or more side-by-side images as a single visually seamless image. In addition, while a camera has been used to capture the position of the pixel pattern reference marks as an alternate embodiment the screen could contain a coordinate sensor for providing coordinate information on the position of each of the pixel reference marks that impinge thereon. In addition, while the mirror has been adjusted to reposition the image on the screen it is apparent that the digital imager or the lens of the digital imager could be repositioned to bring the side-by-side images into proper position to produce a visually seamless image.

While the system provides for automatic alignment of side-by-side images, if desired the image captured by the camera can be compared against a stored image in the computer 27 to monitor other conditions. For example, if the pixel reference mark 14 is out of focus indicating that image 11 is out of focus a comparison of a pixel reference mark on the screen 10 to a stored in focus pixel reference mark in the computer can be used to adjust the focus on the digital imager. FIG. 3 illustrates that when the pixel reference mark is out of focus a focusing signal be sent from computer 27 to digital imager 20 to bring the digital imager 20 back into focus.

If desired, the reference marks included in the images can be continually projected or the reference can be periodically projected onto the screen since comparison of reference marks can be done at periodic times.

We claim:

1. A rear projection image alignment system comprising:
   a rear projection screen having a front side for viewing and a back side for projecting images thereon;
   a first digital imager for projecting a first pixel image onto the rear projection screen, said first pixel image including a first pixel pattern reference mark located within the first pixel image and distinguishable distinct from the first pixel image;
   a reflecting device located on the back side of said rear projection screen;
   a second digital imager for projecting a second pixel image onto the reflecting device with the reflecting device reflecting the second pixel image onto the rear projection screen, said second pixel image including a second pixel pattern reference mark located within the second pixel image and distinguishably distinct from the second pixel image;
   a camera, said camera positioned behind said rear projection screen with said camera having a field of view encompassing the first pixel pattern reference mark on the first pixel image and the second pixel pattern reference mark on the second pixel image;
   a computer for determining an out-of-alignment deviation signal of the first pixel pattern reference mark with respect to the second pixel pattern reference mark; and
   a drive member, said drive member responsive to the out-of-alignment deviation signal for repositioning the reflecting device in response to the out-of-alignment deviation signal so that the first pixel image and the second pixel image can be brought into alignment with each other to produce a single visually seamless image.

2. The system of claim 1 wherein the computer determines a focus deviation signal of the first pixel pattern reference mark; and
   a focusing drive on said first digital imager to enable the computer to send a focusing signal to the first digital imager to thereby bring the first pixel image into proper focus.

3. The system of claim 1 wherein the reflecting device comprises a mirror.

4. An image alignment system comprising:

a screen a first digital imager for projecting a first image onto the screen, said first image including a first pixel pattern reference mark distinguishably distinct from the first image;

a second digital imager for projecting a second image onto the screen, said second image including a second pixel pattern reference mark distinguishably distinct from the second pixel image;

a computer for determining an out-of-alignment deviation signal of the first pixel pattern reference mark and the second pixel pattern reference mark; and a drive member, said drive member responsive to the out-of-alignment deviation signal originating from the computer for repositioning the first images with respect to the second image to thereby bring the first image and the second image into a single visually seamless image.

5. The image alignment system of claim 4 including a camera for capturing a location of the pixel reference marks.

6. The image alignment system of claim 4 wherein first digital imager includes a focus control and said computer generates a focus signal to bring said first digital imager into focus.

7. The image alignment system of claim 4 wherein the screen is a rear projection screen.

8. The image alignment system of claim 4 wherein at least one of the imagers projects at least two images onto the screen with one of the two images containing the first pixel pattern reference mark.

9. The image alignment system of claim 8 including a first mirror for deflecting the first image onto the screen and a second mirror for deflecting the second image onto the screen.

10. The image alignment system of claim 9 wherein the pixel reference mark includes at least three pixels.

11. A method of producing a visually appearing seamless image on a screen comprising:

directing a first image carrying a first pixel pattern reference mark onto a rear projection screen;

directing a second image carrying a second pixel pattern reference mark onto a rear projection screen;

measuring the out-of-alignment deviation of the first pixel pattern reference mark with respect to the second pixel pattern reference mark to produce a deviation signal; and using the deviation signal to reposition the first image with respect to the second image so that the first image and the second image appear to a viewer as a single visually seamless image.

12. The method of claim 11 wherein the first pixel pattern reference mark is maintained distinguishably distinct to a set of pixels that are located around the first pixel pattern reference mark.

13. The method of claim 11 wherein the second pixel pattern reference mark is maintained distinguishably distinct to a set of pixels that are located around the second pixel pattern reference mark.

14. The method of claim 11 wherein a mirror is repositioned to bring the first image and the second image into the single visually seamless image.

15. The method of claim 11 wherein the images are projected onto a rear projection screen.

16. The method of claim 15 wherein each of the first image and the second image are reflected from a mirror onto the rear projection screen.

17. The method of claim 16 wherein each of the pixel reference marks are projected into a corner region of the image to minimize visual intrusion of the viewer.

18. The method of claim 17 including changing each of the images while maintaining the reference marks distinguishably distinct from the changing images.

19. The method of claim 18 including the step of projecting each of the changing images in a side-by-side relationship.

20. The method of claim 11 wherein the first image periodically contains the first pixel pattern and the second image periodically contains the second pixel pattern.

21. The method of claim 11 wherein the image continually contains the first pixel pattern and the second image continually contains the second pixel pattern.

* * * * *